United States Patent
Abadi et al.

(10) Patent No.: US 11,853,860 B2
(45) Date of Patent: *Dec. 26, 2023

(54) ENCODING AND RECONSTRUCTING INPUTS USING NEURAL NETWORKS

(71) Applicant: Google LLC, Mountain View, CA (US)

(72) Inventors: Martin Abadi, Palo Alto, CA (US); David Godbe Andersen, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,559

(22) Filed: Mar. 3, 2022

(65) Prior Publication Data

US 2023/0019228 A1   Jan. 19, 2023

Related U.S. Application Data

(63) Continuation of application No. 16/323,205, filed as application No. PCT/US2017/045329 on Aug. 3, 2017, now Pat. No. 11,308,385.
(Continued)

(51) Int. Cl.
*G06N 3/045* (2023.01)
*G06N 3/084* (2023.01)

(52) U.S. Cl.
CPC ............ *G06N 3/045* (2023.01); *G06N 3/084* (2013.01)

(58) Field of Classification Search
None
See application file for complete search history.

(56) References Cited

U.S. PATENT DOCUMENTS 11,308,385 B2 * 4/2022 Abadi .................... G06N 3/084
2015/0306761 A1   10/2015 O'Connor

FOREIGN PATENT DOCUMENTS

CN   105070293 A   11/2015
CN   105447498 A   3/2016
(Continued)

OTHER PUBLICATIONS

Valency Networks, Cyber Attacks Explained Cryptographic Attacks, Valency Networks, 2015 (Year: 2015).*
(Continued)

*Primary Examiner* — Kakali Chaki
*Assistant Examiner* — Shien Ming Chou
(74) *Attorney, Agent, or Firm* — Fish & Richardson P.C.

(57) ABSTRACT

Systems, methods, devices, and other techniques are described herein for training and using neural networks to encode inputs and to process encoded inputs, e.g., to reconstruct inputs from the encoded inputs. A neural network system can include an encoder neural network, a trusted decoder neural network, and an adversary decoder neural network. The encoder neural network processes a primary neural network input and a key input to generate an encoded representation of the primary neural network input. The trusted decoder neural network processes the encoded representation and the key input to generate a first estimated reconstruction of the primary neural network input. The adversary decoder neural network processes the encoded representation without the key input to generate a second estimated reconstruction of the primary neural network input. The encoder and trusted decoder neural networks can be trained jointly, and these networks trained adversarially to the adversary decoder neural network.

15 Claims, 8 Drawing Sheets

Related U.S. Application Data

(60) Provisional application No. 62/370,954, filed on Aug. 4, 2016.

(56) References Cited

FOREIGN PATENT DOCUMENTS

| | | |
|---|---|---|
| CN | 105825269 A | 8/2016 |
| WO | WO 2016/044856 | 3/2016 |

OTHER PUBLICATIONS

Volna, Cryptography based on Neural Network, ResearchGate, 2012 (Year: 2012).*
Hadke, Use of Neural Networks in Cryptography: A Review, 2016 world conference on Futuristic Trends in Research and Innovations for Social Welfare, Mar. 2016 (Year: 2016).*
Abadi et al. "Learning to Protect Communications with Adversarial Neural Cryptography," arXiv 1610.06918, Oct. 21, 2016, 15 pages.
Abadi et al. "TensorFlow: A System for large-scale machine learning," arXiv preprint arXiv 1605.08695, May 31, 2016, 18 pages.
Abadi et al. "TensorFlow: Large-scale machine learning on heterogeneious distributed systems," arXiv preprint arXiv 1603.04467v2, Mar. 16, 2016, 19 pages.
Barak et al. "On the (im)possibility of obfuscating programs," J. ACM 59(2):6:1-6:48, May 2012, 50 pages.
Barthe et al. "Fully Automated analysis of padding-based encryption in the computational model," Proceedings of the 2013 ACM SIGSAC conference on Computer & communications security, Jun. 2013, 50 pages.
Chen et al. "InfoGANL Interpretable representation learning by information maximizing generative adversarial nets," arXiv preprint arXiv1606.03657, Jun. 12, 2016, 14 pages.
Denton et al. "Deep generative image models using a Laplacian pyramid of adversarial networks," arXiv1506.05751, Jun. 18, 2015, 10 pages.
Dorner et al. "Deep Learning-Based Communication Over the Air," arXiv preprint arXiv 1707.03384, Jul. 11, 2017, 11 pages.
Dourlens. "Applied neuro-cryptography," Memoire, Universite Paris 8, Departement Micro-Inofrmatique Micro-Electronique, 1996, 191 pages.
Edwards et al. "Censoring representations with an adversary," arxiv 1511.05897, Nov. 18, 2015, 13 pages.
Foerster et al. "Learning to communicate to solve riddles with deep distributed recurrent Q-networks," arXiv 1602.02672, Feb. 16, 2016, 10 pages.
Foerster et al. "Learning to communicate with deep multi-agent reinforcement learning," arXiv1605.06676, May 24, 2016, 13 pages.
Ganin et al. "Domain-adversarial training of neural networks," arXiv1505.07818, Nov. 27, 2015, 35 pages.
Ghosh et al. "Message Passing Multi-Agent GANs," arXiv preprint arXiv1612.01294v1, Dec. 5, 2016, 15 pages.
Gilad-Bachrach et al. "CryptoNets: Applying neural networks to encrypted data with high throughput and accuracy," Proceedings of the 33$^{rd}$ International Conference on Machine Learning, Jun. 19-24, 2016, 10 page.
Gohavari et al. "Cryptography Using Neural Network," Annual IEEE INDICON, Dec. 2005, 4 pages.
Goldwasser et al. "Probabilistic encryption," J. Comput. Syst. Sci. 28(2) 1984, 30 pages.
Goodfellow et al. "Explaining and harnessing adversarial examples," arXiv1412.6572v3, Mar. 20, 2015, 11 pages.
Goodfellow et al. "Generative Adversarial Nets," arXiv preprint arXiv1406.2661v1, Jun. 10, 2014, 9 pages.
Goodfellow. "NIPS 2016 tutorial: generative adversarial networks," arXiv preprint arXiv1701.00160v1, Dec. 31, 2016, 57 pages.
Hayes et al. "Generating steganographic images via adversarial training," [online] [retrieved on Jul. 26, 2017] Retrieved from Internet: URL<http://www.homepages.ucl.ac.uk/~ucabaye/papers/stegpaper.pdf> 9 pages.
Hayes et al. "ste-GAN-ography: Generating Steganographic Images via Adversarial Training," arXiv preprint arXiv 1703.00371v3, Jul. 24, 2017, 2017, 9 pages.
Kingma et al. "Adam: A method for stochastic optimization," arXiv 1412.6980v9, Jan. 30, 2017, 15 pages.
Kinzel et al. "Neural cryptography," arXiv preprint cond-mat0208453, Aug. 23, 2002, 4 pages.
Klimov et al. "Analysis of neural cryptography," Advances in Cryptology—ASIACRYPT 2002, 8$^{th}$ International Conference on the Theory and Application of Cryptology and Information Security, Dec. 1-5, 2002, 11 pages.
LeCun et al. "Deep learning," Nature, 521, 2015, 9 pages.
Louizos et al. "The variational fair autoencoder," arXiv 1511.00830v5, Feb. 4, 2016, 11 pages.
Lowe et al. "Multi-Agent Actor-Critic for Mized Cooperative-Competitive Environments," arXiv preprint arXiv 1706.02275v2, Jun. 21, 2017, 16 pages.
Makhzani, Adversarial Autoencoders, arXiv, May 2016 (Year: 2016).
Neelakantan et al. "Neural programmer: Inducing latent programs with gradient descent," arXiv 1511.04834v3, Aug. 4, 2016, 18 pages.
Nowozin et al. "f-GAN: Training fenerative neural samplers using variational divergence minimization," arXiv1606.00709v1, Jun. 2, 2016, 17 pages.
O'Shea et al. "An introduction to machine learning communications systems," arXiv preprint arXiv1702.00832v2, Jul. 11, 2017, 13 pages.
Oord, Conditional Image Generation with PixelCNN Decoders, arXiv, Jun. 2016 (Year: 2016).
PCT International Preliminary Report on Patentability issued in International Application No. PCT/US2017045329, dated Feb. 14, 2019, 12 pages.
PCT International Search Report and Written Opinion issued in International Application No. PCT/US2017/045329, dated Nov. 21, 2017, 19 pages.
Ratliff et al. "Characterization and computation of local nash equilibria in continiuous games," In Communication, Control, and Computing (Allerton), 2013, 51$^{st}$ Annual Allerton Conference on, Oct. 3, 2013, 28 pages.
Revankar et al. "Cryptography Using Neural Network," Dec. 31, 2009, [retrieved on Nov. 7, 2017] Retrieved from Internet: URL:<https://www.researchgate.net/profile/dilip_Rathod4/publication/314286032_Cryptography_Using_Neural_network.links.58bfdb0da6fdcc63d6d18094/Cryptography-Using-Neural-Network.pdf> 4 pages.
Rudy, Generative Class-Conditional Denoising Autoencoder, arXiv, 2015 (Year: 2015).
Ruttor. "Neural Synchronization and cryptography," Phd thesis, Julius Maximilian University of Wurzberg, 2006, published online at arXiv0711.2411v1, Nov. 15, 2007, 120 pages.
Salimans et al. "Improved techniques for training GANs," arXiv 1606.03498v1, Jun. 10, 2016, 10 pages.
Sanjeev et al. "Generalization and Equilibrium in Generative Adversarial Nets," arXiv preprint arXiv1703.00573v4, Jun. 17, 2017, 27 pages.
Sukhbaatar et al. "Learning multiagent communication with backpropagation," arXiv 1605.07736v2, Oct. 31, 2016, 12 pages.
Szegedy et al. "Intriguing properties of neural networks," arXiv 1312.6199v4, Feb. 19, 2014, 10 pages.
Volna, Cryptography Based on Neural Network, Research Gate, May 2012 (Year: 2012).
Williams et al. "Simple statistical gradient-following algorithms for connectionist reinforcement learning," Machines Learning, 1992, 28 pages.
Xie et al. "Crypto-nets: Neural networks over encrypted data," arXiv 1412.6181v2, Dec. 24, 2014, 9 pages.
Yadav et al. "Stabilizing Adversarial Nets with Prediction Methods," arXiv preprint arXiv1705.07364, Jun. 9, 2017, 18 pages.
Office Action in Chinese Appln. No. 201780056545.6, dated Dec. 1, 2022, 29 pages (with English Translation).

* cited by examiner

ENCODING AND RECONSTRUCTING INPUTS USING NEURAL NETWORKS

CROSS-REFERENCE TO RELATED APPLICATION

This application is a continuation application of U.S. application Ser. No. 16/323,205, filed Feb. 4, 2019, which is a National Stage Application under 35 U.S.C. § 371 and claims the benefit of International Application No. PCT/US2017/045329, filed Aug. 3, 2017, which claims priority to U.S. Provisional Application No. 62/370,954, filed Aug. 4, 2016. The disclosure of the foregoing applications are incorporated by reference in their entireties.

TECHNICAL FIELD

This specification generally describes systems, methods, devices, and other techniques for training and using neural networks to encode inputs and to process encoded inputs, e.g., to reconstruct inputs from the encoded inputs.

BACKGROUND

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

Neural networks have been trained to perform various data processing tasks, such as classification, prediction, and translation. Some systems include multiple data processing components, e.g., in successive stages, to carry out a given task.

SUMMARY

This specification discloses neural networks and neural network training systems that can be implemented as computer programs on one or more computers in one or more locations. For example, neural networks are described that apply a neural network input key to obfuscate a neural network input in order to obfuscate (e.g., encode) the neural network input and prevent it from being reconstructed by another neural network. For example, an encoder neural network and a trusted decoder neural network can be jointly trained to encode and decode, respectively, a primary neural network input using a shared secret key or a public-private key pair. The encoder neural network and the trusted decoder neural network can further be trained adversarially with respect to an adversary decoder neural network that attempts to decode the output of the encoder neural network, although the adversary decoder neural network may not have access to the decoding key. The training system may not only encourage the first decoder neural network to generate accurate reconstructions of the original neural network input, but may also reward the encoder neural network for generating encoded representations of the neural network input that cannot be accurately decoded by the adversary decoder neural network.

In some implementations, a neural network training system trains an encoder neural network and a first decoder neural network. The encoder neural network is trained to generate an encoded representation of a first input by processing the first input and a second input that is distinct from the first input. The first decoder neural network is trained to generate an estimated reconstruction of the first input by processing the encoded representation of the first input and either the second input or a third input that is related to the second input. In some examples, the encoder neural network and first decoder network are configured to encrypt and decrypt the first input, respectively. The encoder neural network generates the encoded representation of the first input (e.g., encrypts the first input) using an encryption key and the first decoder neural network generates the estimated reconstruction of the first input (e.g., decrypts the encoded representation of the first input) using a corresponding decryption key. The encryption and decryption keys may be the same for symmetric encryption or complementary (e.g., a public-private key pair) for asymmetric encryption.

The training system can train the encoder neural network and the first decoder neural network to protect the secrecy of all or a portion of the first input. For example, the encoder neural network and the first decoder neural network can be trained in conjunction with a second decoder neural network that represents an adversary. Generally, the second decoder neural network attempts to compromise the secrecy of all or a portion of the first input, e.g., by attempting to reconstruct the first input from the encoded representation of the first input. To disrupt the ability of the second decoder neural network to achieve its goal, the training system can, for example, adjust the parameters of the encoder neural network and the first decoder neural network using a loss function that encourages accurate reconstruction of inputs by the first decoder neural network, but discourages accurate reconstruction of inputs by the second decoder neural network. Moreover, the training system can train the encoder neural network and first decoder neural network on batches of training data in alternation with training of the second decoder neural network. The trained system can be useful, in some examples, to obfuscate sensitive information represented in an input so that other systems that process the encoded representation of the input cannot reliably determine the sensitive information without an appropriate key.

After training, to generate an estimated reconstruction of an input, a computer system receives an encoded representation of a first input and a second input. The second input can be distinct from the encoded representation of the first input, e.g., the second input may be a public or private key that was generated independently of the encoded representation of the first input. A decoder neural network on the computer system can process the encoded representation of the first input and the second input to generate an estimated reconstruction of the first input. The decoder neural network then provides an indication of the estimated reconstruction of the first input. The estimated reconstruction of the first input may be subject to further processing, displayed to a user, stored, or a combination of these.

In some implementations, the encoded representation of the first input is generated by an encoder neural network by processing the first input and a third input that is distinct from the first input. The second input and third input can be identical or related to each other. For example, the third input can be derived from the second input according to a first pre-defined set of transformations, the second input can be derived from the third input according to a second pre-defined set of transformations, or the second input and the third input can both be derived according to a common procedure so as to be complementary to each other. In instances that the second and third inputs are identical, these inputs may represent a shared secret key. In other instances, the second and third inputs may collectively represent a private-public key pair.

In some implementations, processing, by the decoder neural network, the encoded representation of the first input and the second input to generate the estimated reconstruction of the first input includes decoding the encoded representation of the first input using the second input.

In some implementations, the decoder neural network can include one or more fully-connected layers followed by one or more convolutional layers.

In some implementations, the encoded representation of the first input can be an encoded representation of at least one of a text sequence or one or more numbers.

In some implementations, the decoder neural network can be configured to process the encoded representation of the first input and the second input to generate an indication of whether the encoded representation of the first input has been tampered with subsequent to initial generation of the encoded representation of the first input by an encoder neural network. The decoder neural network can further provide, e.g., for display, further processing, or storage, the indication of whether the encoded representation of the first input has been tampered with.

In some implementations, the first input is derived from an initial input according to a pre-defined set of transformations. In some implementations, the estimated reconstruction of the first input is an estimation of one or more values derived from the first input according to a pre-defined set of transformations.

In some implementations, a neural network system including an encoder neural network and a first decoder neural network can trained. The encoder neural network and the first decoder neural network can be trained together in alternation with a second decoder neural network in an adversarial arrangement. For example, the encoder neural network can be trained to encode an input so as to allow the first decoder neural network to accurately reconstruct the input (e.g., decode the encoded representation of the input) by processing the encoded representation of the input and a private key, while disrupting an ability of the second decoder neural network to reconstruct the input by processing the encoded representation of the input either alone or together with a public key (but without the private key).

In particular, some implementations for training the neural network system include obtaining training data pairs that each includes a respective first input and a respective second input. The respective first inputs can be inputs that are to be encoded and the respective second inputs can be private or public keys, for example. The neural network system can be trained on the training data pairs. For each training data pair, the system can process, using an encoder neural network in accordance with current values of parameters of the encoder neural network, (i) the respective first input for the training data pair and (ii) the respective second input for the training data pair to generate an encoded representation of the respective first input for the training data pair. The system can process, using a first decoder neural network in accordance with current values of parameters of the first decoder neural network, (i) the encoded representation of the respective first input for the training data pair and (ii) the respective second input for the training data pair or a respective third input for the training data pair to generate a first estimated reconstruction of the respective first input for the training data pair, wherein (i) the respective second input for the training data pair is derived from the respective third input for the training data pair, (ii) the respective third input for the training data pair is derived from the respective second input for the training data pair, or (iii) the respective second input for the training data pair and the respective third input for the training data pair are both derived using a common procedure so as to be complementary to each other. Further, the system can obtain a second estimated reconstruction of the respective first input for the training data pair, the second estimated reconstruction generated by a second decoder neural network, in accordance with current parameters of the second decoder neural network, by processing the encoded representation of the respective first input for the training data pair without processing the respective second input for the training data pair. The current parameters of the encoder neural network and the current parameters of the first decoder neural network can be adjusted based on the respective first input, the first estimated reconstruction of the respective first input, and the second estimated reconstruction of the respective first input.

In some implementations, training the neural network system includes, for each training data pair, generating, by the first decoder neural network, the first estimated reconstruction of the respective first input for the training data pair by processing, in accordance with the current parameters of the first decoder neural network, (i) the encoded representation of the respective first input for the training data pair and (ii) the respective second input for the training data pair.

In some implementations, training the neural network system includes, for each training data pair, generating, by the first decoder neural network, the first estimated reconstruction of the respective first input for the training data pair by processing, in accordance with the current parameters of the first decoder neural network, (i) the encoded representation of the respective first input for the training data pair and (ii) the respective third input for the training data pair that corresponds to the respective second input.

In some implementations, the encoder neural network can include one or more fully-connected layers followed by one or more convolutional layers. In some implementations, the first decoder neural network can include one or more fully-connected layers followed by one or more convolutional layers. In some implementations, the second decoder neural network can include one or more fully-connected layers followed by one or more convolutional layers.

In some implementations, training the neural network system can include adjusting the current parameters of the encoder neural network and the current parameters of the first decoder neural network based on at least one of (i) differences between respective first inputs from the training data pairs and estimated reconstructions of the respective first inputs generated by the first decoder neural network system or (ii) differences between respective first inputs from the training data pairs and estimated reconstructions of the respective first inputs generated by the second decoder neural network system.

In some implementations, training the neural network system can include adjusting the current parameters of the encoder neural network and the current parameters of the first decoder neural network using stochastic gradient descent. The training can further include, for each training data pair, adjusting the current parameters of the encoder neural network and the current parameters of the first decoder neural network without adjusting the current parameters of the second decoder neural network.

In some implementations, the system obtains second training data pairs that each include a respective fourth input and an encoded representation of the respective fourth input, wherein the encoded representation of the respective fourth input is generated using the encoder neural network in accordance with current parameters of the encoder neural network. The second decoder neural network can be trained on the second training data pairs, including, for each second training data pair: processing, using the second decoder neural network in accordance with current values of the second decoder neural network, the respective encoded representation of the respective fourth input for the second training data pair to generate an estimated reconstruction of the respective fourth input for the second training data pair; and adjusting the current parameters of the second decoder neural network based on a difference between the respective fourth input and the estimated reconstruction of the respective fourth input without adjusting the current parameters of the encoder neural network and without adjusting the current parameters of the first decoder neural network.

In some implementations, for each of the second training data pairs, the encoded representation of the respective fourth input for the second training data pair is generated by processing, using the encoder neural network in accordance with current parameters of the encoder neural network, (i) the respective fourth input and (ii) a respective fifth input corresponding to the second training data pair that is distinct from the respective fourth input. Training the second decoder neural network on the second training data pairs includes, for each second training data pair, processing, using the second decoder neural network in accordance with current values of the second decoder neural network, (i) the respective encoded representation of the respective fourth input for the second training data pair and (ii) a respective sixth input corresponding to the second training data pair. For each of the second training data pairs, (i) the respective fifth input can be derived from the respective sixth input, (ii) the respective sixth input can be derived from the respective fifth input, or (iii) the respective fifth input and the respective sixth input can both be derived using a common procedure so as to be complementary to each other. In some implementations, for each of the second training data pairs, the respective fifth input corresponding to the second training data pair represents a private key of a public-private key pair and the respective sixth input corresponding to the second training data pair represents a public key of the public-private key pair. In some implementations, the encoded representations of the respective fourth inputs are generated using the encoder neural network in accordance with current values of the encoder neural network following training of the encoder neural network with the first training data pairs.

In some implementations, the respective first input for a first training data pair among the obtained training data pairs represents at least one of a text sequence or one or more numbers.

In some implementations, for each training data pair, the second estimated reconstruction of the respective first input for the training data pair is generated by the second decoder neural network, in accordance with current parameters of the second decoder neural network, by processing only the encoded representation of the respective first input for the training data pair without processing the respective second input for the training data pair and without processing the respective third input for the training data pair.

In some implementations, for each training data pair, the second estimated reconstruction of the respective first input for the training data pair is generated by the second decoder neural network, in accordance with current parameters of the second decoder neural network, by processing (i) the encoded representation of the respective first input for the training data pair and (ii) the respective third input for the training data pair, without processing the respective second input for the training data pair.

In some implementations, for each training data pair, the respective second input for the training data pair represents a private key of a public-private key pair. In some implementations, the respective third input for the training data pair represents a public key of the public-private key pair.

In some implementations, training neural network system, including the encoder neural network and the first decoder neural network, can be trained in alternation with the second decoder neural network. For example, when the encoder neural network and the first decoder neural network are being trained on a batch of training data pairs, the parameters of the second decoder neural network can be fixed. Subsequently, when the second decoder neural network is being trained on a batch of training data pairs, the parameters of the encoder neural network and the first decoder neural network can be fixed.

Some implementations of the subject matter disclosed herein may realize, in certain instances, one or more advantages. A neural network system can be trained to obfuscate sensitive information in data processed by the system from at least a portion of the system. For example, personal or identifying information about users may be hidden from a portion of the system so that it is prevented from acting on such information. In some implementations, different components of a neural network system can be trained in an adversarial manner so as to protect the confidentiality of information processed by a first portion of the system from a second portion of the system. In some implementations, sensitive information in data processed by the system can be encrypted or otherwise obfuscated by an encoder neural network against adversaries generally who do not possess a requisite reconstruction key to reconstruct the neural network input. Additional features and advantages will be understood by persons of ordinary skill in the art in light of the entire disclosure, including the written description, the claims, and the drawings.

DETAILED DESCRIPTION

Figure 1:
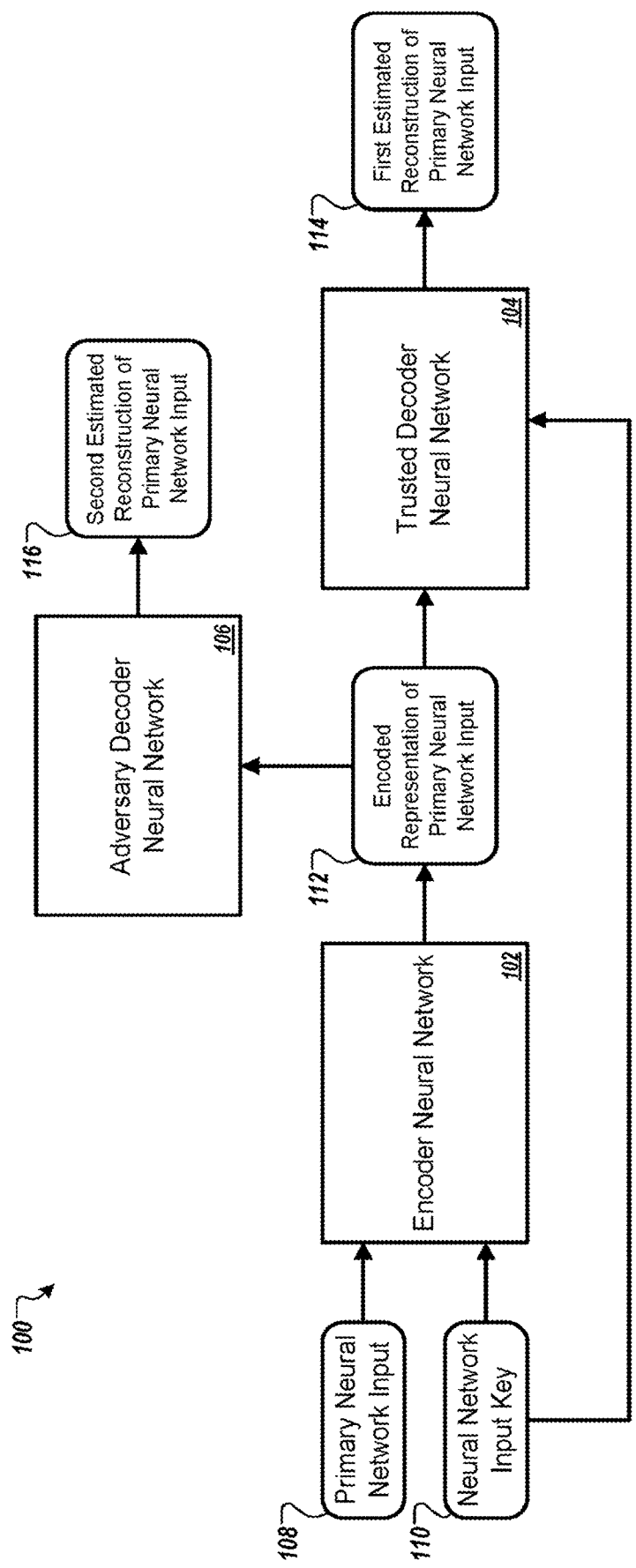
FIG. 1 depicts a block diagram of a neural network system for transforming and reconstructing a primary neural network input using a symmetric neural network input key.

FIG. 1 shows a block diagram of a neural network system 100 for transforming and reconstructing a primary neural network input 108 using a symmetric neural network input key 110. The system 100 includes an encoder neural network 102, a trusted decoder neural network 104, and an adversary decoder neural network 106. In some implementations, the encoder neural network 102 is configured to encode, encrypt, obfuscate, or otherwise transform, input data in a manner that allows the trusted decoder neural network 104 to reconstruct the original input data with at least a threshold expected accuracy using a secret key, while preventing the adversary decoder neural network 106 from reconstructing the original input data with at least a threshold expected accuracy without the secret key.

The encoder neural network 102 is configured to process a primary neural network input 108 and a neural network input key 110 to generate an encoded representation of the primary neural network input 112. The encoded representation of the primary neural network input 112 is a modified version of the primary neural network input 108 that has been transformed according to parameters of the encoder neural network 102 and based on the neural network input key 110. In a cryptographic context, the encoder neural network 102 can be said to apply cryptographic transformations to the primary neural network input 108 to generate the encoded representation of the primary neural network input 112 using a key. For example, the primary neural network input 112 can be a plaintext representation of input data, the neural network input key 110 can be a cryptographic key (e.g., a shared secret key), and the encoded representation of the primary neural network input 112 can be ciphertext, i.e., an encrypted version of the primary neural network input 112.

The trusted decoder neural network 104 and the adversary decoder neural network 106 are each configured to process the encoded representation of the primary neural network input 112 to generate estimated reconstructions of the primary neural network input 108. However, unlike the adversary decoder neural network 106, the trusted decoder neural network 104 has access to the neural network input key 110 that was used to generate the encoded representation of the primary neural network input 112. For example, the trusted decoder neural network 104 may be a trusted counterpart of the encoder neural network 102, while the adversary decoder neural network 106 is untrusted. The trusted decoder neural network 104 processes the primary neural network input 108 along with the neural network input key 110 to generate the first estimated reconstruction to the primary neural network input 114. As discussed with respect to FIGS. 5-7, below, the encoder neural network 102 and the trusted decoder neural network 104 can be jointly trained so that the trusted decoder neural network 104 generates highly accurate reconstructions of the primary neural network input 114 while preventing the adversary decoder neural network 106 from reliably generating accurate reconstructions of the primary neural network input 108. The adversary decoder neural network 106 processes the encoded representation of the primary neural network input 112 without processing the neural network input key 110 to generate the second estimated reconstruction of the primary neural network input 116.

The encoder neural network 102, trusted decoder neural network 104, and adversary decoder neural network 106 may or may not share a common architecture. In some implementations, each of the networks 102, 104, and 106 has a "mix and transform" architecture that is capable of learning mixing functions such as XOR during training. The "mix and transform" architecture includes a first fully-connected layer followed by a sequence of convolutional layers. The number of outputs from the fully connected layer can equal the number of input data items to the neural network. Thus, for the encoder neural network 102, the primary neural network input 108 may include n input data items and the neural network input key 110 may include m input data items. The fully-connected layer can include m+n nodes, where each node provides an activation function that can produce an output to the first convolutional layer that is a linear combination of all the input data items from the primary neural network input 108 and the neural network input key 110. The convolutional layers are trained to apply some function to groups of the outputs mixed by the previous layer, without an a priori specification of what that function should be. The last of the convolutional layers produces a suitably sized output of the neural network (e.g., the encoder neural network 102 outputs the encoded representation of primary neural network input 112).

The first neural network input 108 can be a representation of an initial data item that has been converted to a suitable form for processing by the encoder neural network 102. For example, the initial data item may be text (e.g., a sequence of tokens of alphanumeric characters), an image, binary data, or other types of data. In some implementations, the encoder neural network 102, trusted decoder neural network 104, and adversary decoder neural network 106 are configured to operate over tuples of floating-point numbers. For such implementations, the primary neural network input 108, as well as the neural network input key 110, the encoded representation of the primary neural network input 112, the first estimated reconstruction of the primary neural network input 114, and the second estimated reconstruction of the primary neural network input 116 are each tuples of floating-point numbers, where each tuple includes an ordered set of data items (e.g., floating-point numbers). The encoded representation 112 and the estimated reconstructions 114 and 116 may include arbitrary floating-point numbers within a given range, e.g., the range −1 to 1, even if the primary neural network input 108 and the neural network input key 110 consist only of binary values, e.g., 0s and 1s.

Figure 2:
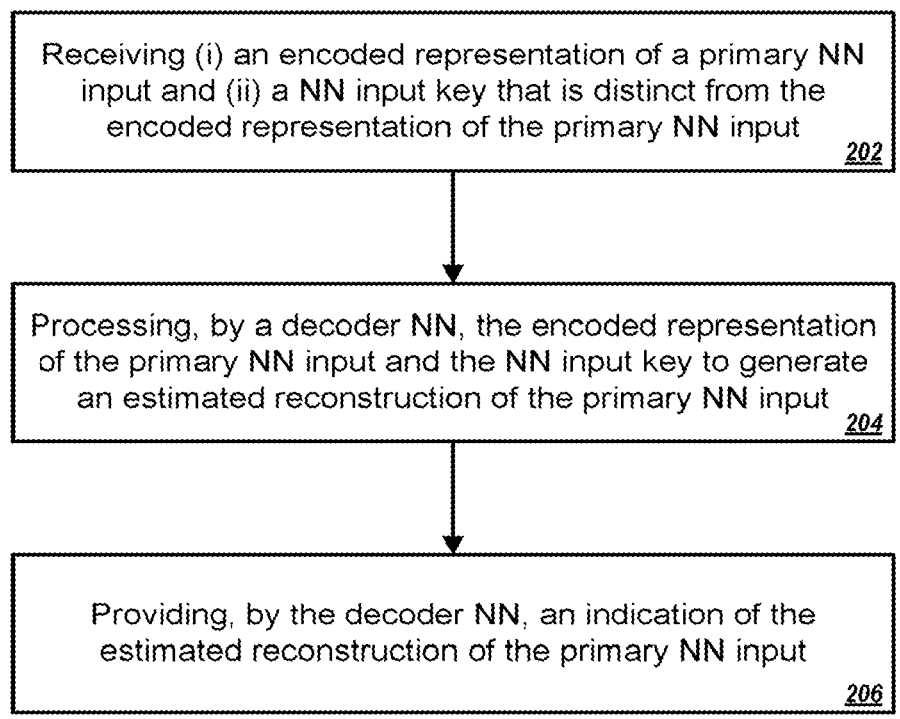
FIG. 2 depicts a flowchart of an example process for reconstructing a neural network input from an encoded representation of the neural network input.

Referring to FIG. 2, a flowchart is shown of an example process 200 for reconstructing a neural network input from an encoded representation of the neural network input. In some implementations, the process 200 can be carried out by a trusted decoder neural network that has access to a decryption key, e.g., trusted decoder neural network 104.

At stage 202, the decoder neural network obtains two inputs: (i) an encoded representation of a primary neural network input, e.g., encoded representation 112, and (ii) a neural network input key that is distinct from the encoded representation of the primary neural network input, e.g., neural network input key 110. The encoded representation of the primary neural network input may have been generated by an encoder neural network, e.g., encoder neural network 102, by processing a primary neural network input, e.g., primary neural network input 108, and the neural network input key.

At stage 204, the decoder neural network processes the two inputs that were obtained at stage 202 to generate an estimated reconstruction of the primary neural network input, e.g., first estimated reconstruction 114. The estimated reconstruction of the primary neural network input is generated by processing the inputs through a series of transformations dictated by one or more hidden layers of the decoder neural network. At stage 206, the decoder neural network outputs the estimated reconstruction of the primary neural network input. The output can be stored or otherwise made available to an application or system that further processes the output, e.g., for presentation to a user.

Figure 3:
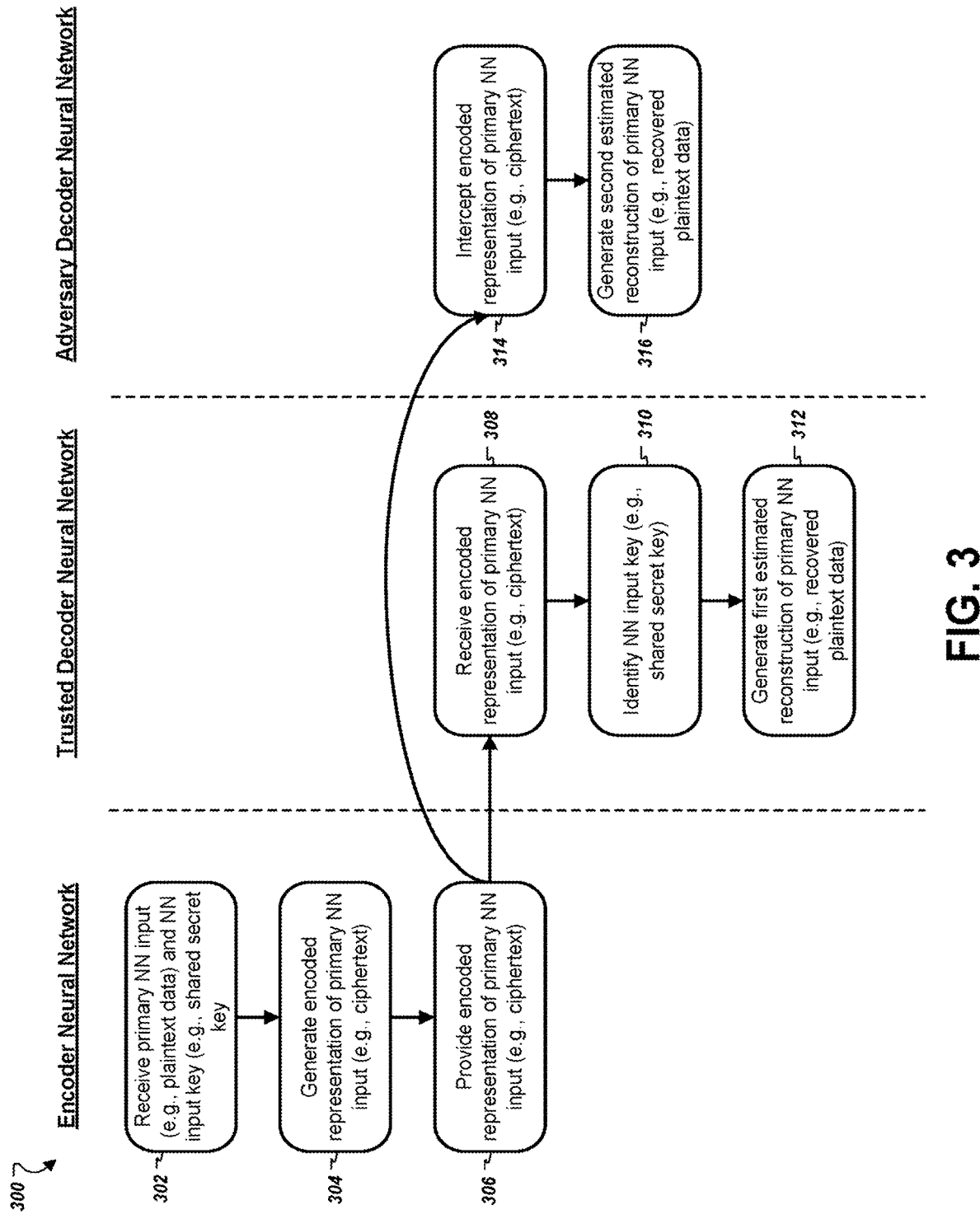
FIG. 3 depicts a swim-lane diagram of an example process for encoding and recovering a neural network input using symmetric neural network input keys.

FIG. 3 depicts a swim-lane diagram 300 of an example process for encoding and recovering a neural network input using symmetric neural network input keys. The left-most lane indicates operations of an encoder neural network, e.g., encoder neural network 102; the middle lane indicates operations of a trusted decoder neural network, e.g., first decoder neural network 104; and the right-most lane indicates operations of an adversary decoder neural network, e.g., second decoder neural network 106.

At stage 302, the encoder neural network receives a primary neural network input, e.g., primary neural network input 108 and a neural network input key, e.g., neural network input key 110. At stage 304, the encoder neural network processes the primary and neural network input keys to generate an encoded representation of the primary neural network input. At stage 306, the encoder neural network outputs the encoded representation of the primary neural network input, which is then made available to the trusted decoder neural network.

The trusted decoder neural network obtains the encoded representation of the primary neural network input (stage 308) and is provided the neural network input key as a decryption key for the encoded representation of the primary neural network input (stage 310). At stage 312, the trusted decoder neural network then uses the neural network input key to generate an estimated reconstruction of the primary neural network input by processing the encoded representation of the primary neural network input and the neural network input key according to trained values of parameters of the trusted decoder neural network. In some implementations, the trusted decoder neural network is trained to generate an estimated reconstruction of the first neural network that has at least a threshold probability (e.g., 90-98%) of meeting a specified accuracy target.

Before, during, or after the trusted decoder neural network performs its operations at stages 308-312, the adversary decoder neural network performs its operations at stages 314-316. In particular, at stage 314, the adversary decoder neural network obtains (e.g., intercepts) the encoded representation of the primary neural network input, and at stage 316, the adversary decoder neural network processes the encoded representation of the primary neural network input to generate a second estimated reconstruction of the primary neural network input. As a result of joint training between the encoder neural network and the trusted decoder neural network, and adversarial training between these networks and the adversary decoder neural network, the adversary decoder neural network is generally unable to recover the primary neural network input from the encoded representation of the primary neural network input with high confidence that the estimated reconstruction is accurate. Even though the adversary decoder neural network is trained to generate estimated reconstructions as accurately as possible without the secret key, as a result of the joint training between the encoder and the trusted decoder neural network, the encoded representation of the primary neural network input is transformed in such a way as to make the adversary's attempts to reconstruct the input inaccurate.

Thus, the encoder neural network may communicate the primary neural network input to the trusted decoder neural network with confidence in its secrecy with respect to the adversary decoder neural network or other adversaries.

Figure 4:
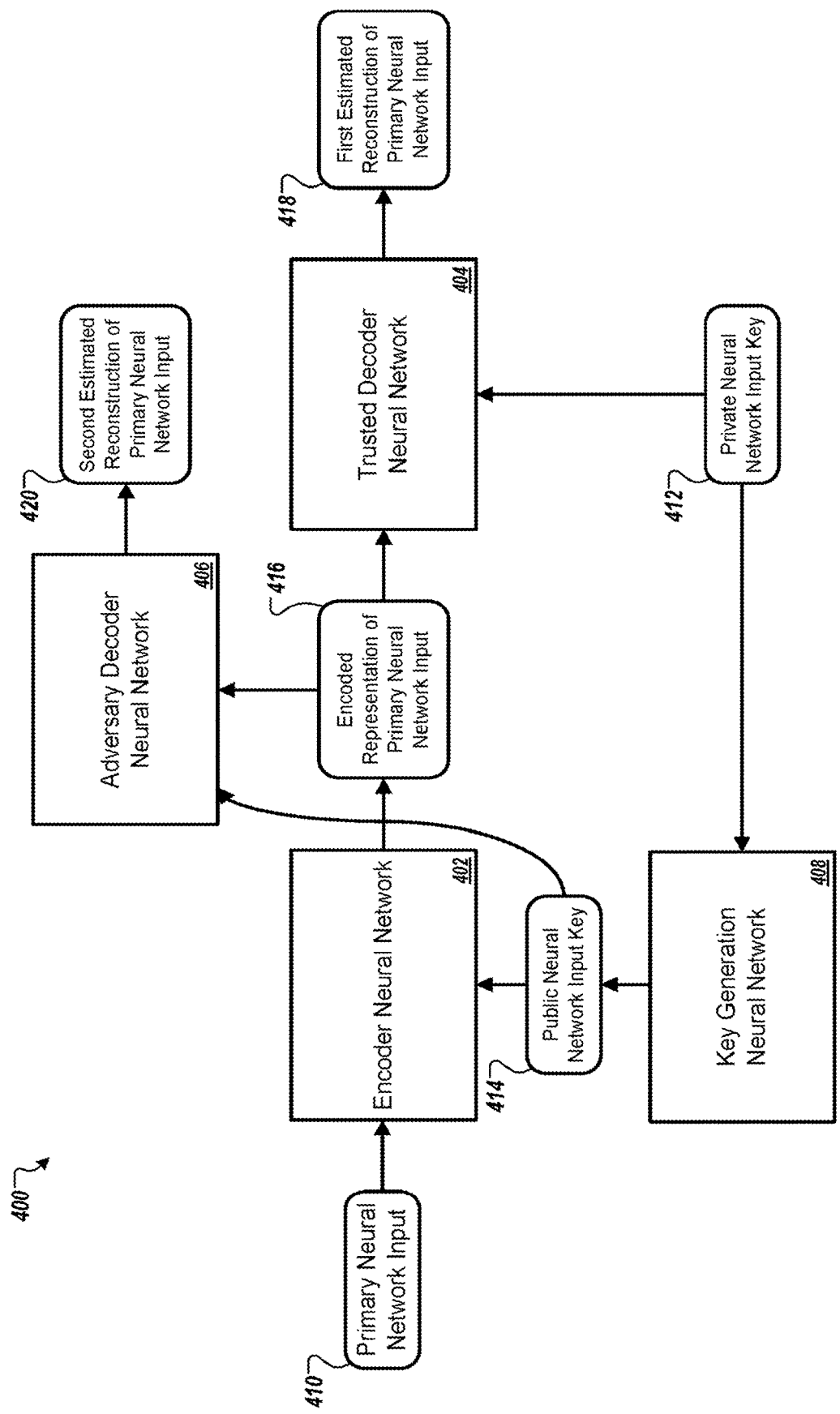
FIG. 4 depicts a block diagram of a neural network system for transforming and reconstructing a primary neural network input using asymmetric neural network input keys.

FIG. 4 depicts a block diagram of a neural network system for transforming and reconstructing a primary neural network input using asymmetric neural network input keys. In contrast to the system 100 depicted in FIG. 1, which used the same key (i.e., neural network input key 110) for both forward and reverse transformations applied to the primary neural network input and the encoded representation of the primary neural network input, respectively, FIG. 4 illustrates a system 400 that uses different neural network input keys 414 and 412 for the forward and reverse transformations, respectively. For example, keys 414 and 412 may be a public-private key pair in which key 412 is a secret key available only to the trusted decoder neural network 404, and key 414 is a public key that is generally available to other entities in the system 400.

As with the symmetric transformation system 100 (FIG. 1), the system 400 depicted in FIG. 4 includes an encoder neural network 402, a trusted decoder neural network 404, and an adversary decoder neural network 406. The trusted decoder neural network 404 may be a trusted decoder that has been trained jointly with the encoder neural network 402, and the pair of networks 402, 404 may be adversarially trained with the adversary decoder neural network 406 as an adversary decoder network. The encoder neural network 402 is configured to process the primary neural network input 410 (e.g., a plaintext data item) and public neural network input key 414 to generate an encoded representation of the primary neural network input 416 (e.g., a ciphertext item). The trusted decoder neural network 404 is configured to process the encoded representation of the primary neural network input 416 and the secret neural network input key 412 to generate a first estimated reconstruction of the primary neural network input 418.

Unlike the symmetric transformation system in which the neural network input key is a shared secret, in system 400 the encoding key, e.g., public neural network input key 414, is also available to the adversary decoder neural network 406. Therefore, the adversary decoder neural network 406 can process the encoded representation of the primary neural network input 416 along with the public neural network input key 414 in its attempt to reconstruct the primary neural network input 410. Even though the encoder neural network 402 uses the public neural network input key 414 to apply forward transformations to the primary neural network input 410, the adversary decoder neural network 406 can be trained to use the public neural network input key 414 to apply reverse transformations to the encoded representation of the primary neural network input 416, to the extent it is useful. In other implementations, the adversary decoder neural network 406 may be configured to process only the encoded representation of the primary neural network input 416 to generate the second estimated reconstruction of the primary neural network input 420, without use of the public neural network input key 414.

The system 400 can further include a key generation neural network 408. The key generation neural network 408 is configured to generate the public neural network input key 414 from the secret neural network input key 412. In other implementations, the key generation neural network 408 can be configured to generate the secret neural network input key 412 from the public neural network input key 414, or keys 412, 414 may be generated from a common procedure so as to be complementary to each other. The key generation neural network 408 has its own parameters and, in some implementations, is trained jointly with the encoder neural network 402 and the trusted decoder neural network 404.

Figure 5:
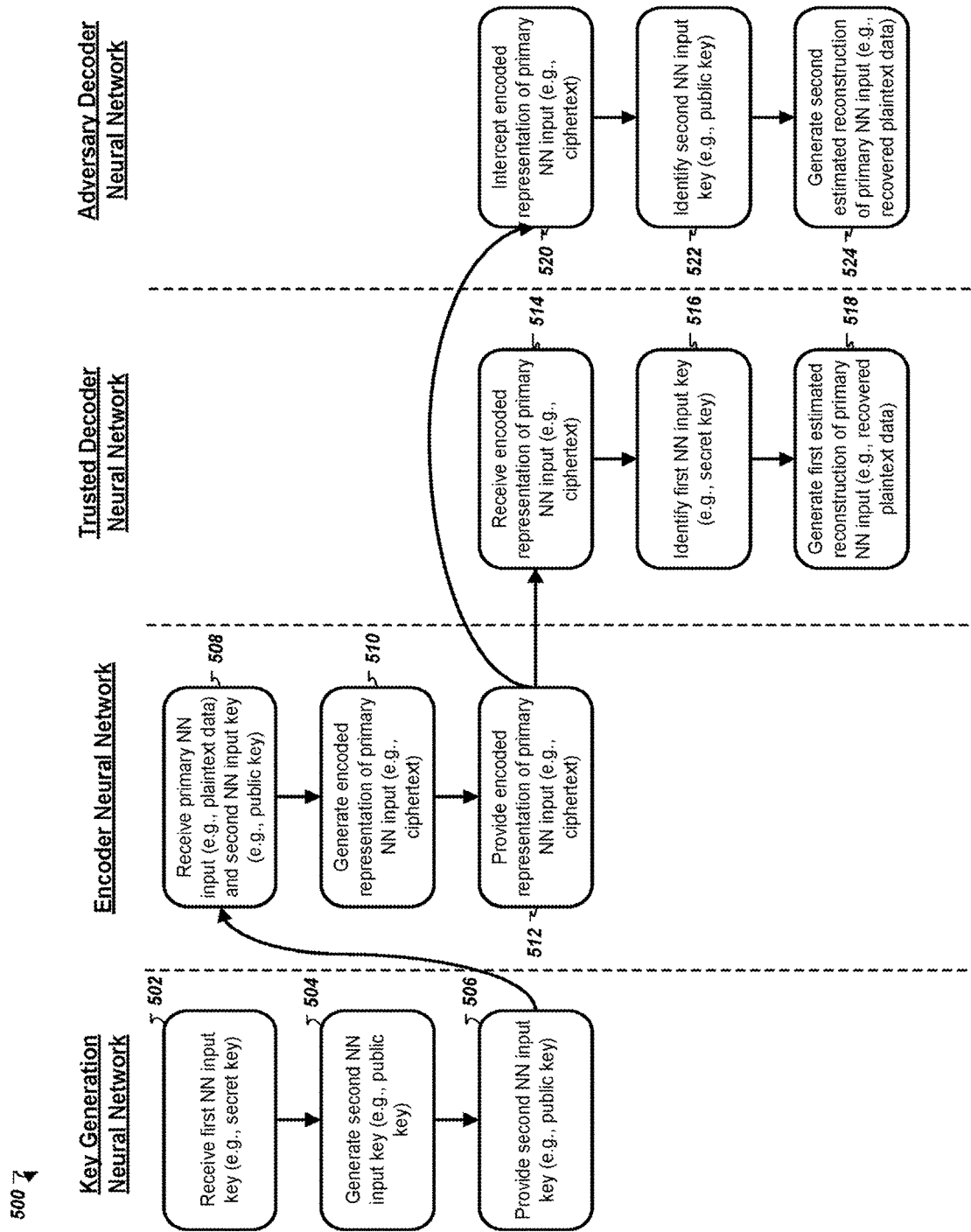
FIG. 5 depicts a swim-lane diagram of an example process for encoding and recovering a neural network input using asymmetric neural network input keys.

FIG. 5 is a swim-lane diagram of an example process 500 for encoding and recovering a neural network input using asymmetric neural network input keys. In some implementations, the process 500 is carried out by a neural network system that is configured to perform asymmetric transformations, e.g., neural network system 400. The neural network system can include a key generation neural network, e.g., key generation neural network 408; an encoder neural network, e.g., encoder neural network 402; a trusted decoder neural network, e.g., trusted decoder neural network 404; and an adversary decoder neural network, e.g., adversary decoder neural network 406.

In some implementations, the process 500 begins with obtaining neural network input keys. At stage 502, the key generation neural network receives a first neural network input key (e.g., a secret key). The key generation neural network 502 processes the first neural network input key to generate a second neural network input key (e.g., a public key) (stage 504). The second neural network input key is then made available to the encoder neural network (stage 506).

At stage 508, the encoder neural network receives a set of inputs that include the primary neural network input and the second neural network input key. The encoder neural network generates an encoded representation of the primary neural network input by processing the primary neural network input and the second neural network input key through each of the layers of the encoder neural network (stage 510). At stage 512, the system provides the encoded representation of the primary neural network input to the trusted decoder neural network.

The trusted neural network receives the encoded representation of the primary neural network input (stage 514). The trusted neural network is also provided with the first neural network input key (e.g., a secret decryption key) (stage 516) and the trusted neural network generates a first estimated reconstruction of the primary neural network input by processing the encoded representation and the first neural network input key through each of its layers (stage 518). The first estimated reconstruction of the primary neural network input may closely match the primary neural network input as a result of the trusted neural network having the corresponding decryption key, i.e., the first neural network input key, and having been trained to apply reverse transformations to encoded representations in order to reconstruct a neural network input.

In some implementations, the adversary decoder neural network may attempt to break the encryption that the encoder neural network input applied to the primary neural network input. At stage 520, the adversary decoder neural network obtains the encoded representation of the primary neural network input. For example, a malicious entity may have intercepted the encoded representation in a communication from an entity associated with the encoder neural network to an entity associated with the trusted decoder neural network. At stage 522, the adversary decoder neural network obtains the second neural network input key, e.g., a public key that was used to encrypt the primary neural network input. Then, at stage 524, the adversary decoder neural network generates a second estimated reconstruction of the primary neural network input. However, because the encoder and trusted decoder neural networks have been jointly trained to apply transformations that the adversary decoder neural network cannot reliably reverse, the second estimated reconstruction of the primary neural network input is likely not an accurate recovery of the primary neural network input.

Figure 6:
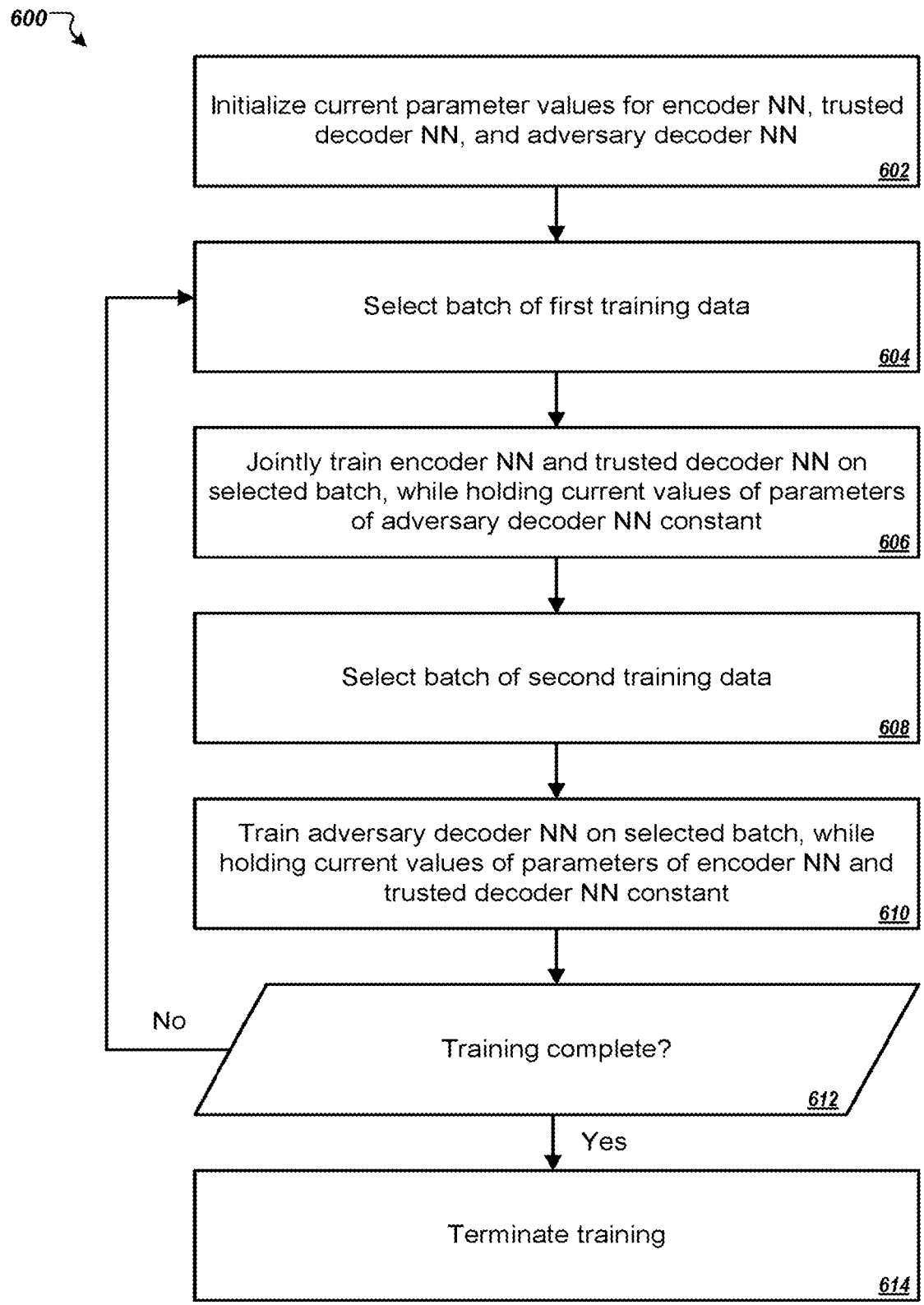
FIG. 6 is a flowchart of an example process for training a neural network system that includes an encoder neural network, a trusted decoder neural network, and an adversary decoder neural network.

FIG. 6 is a flowchart of an example process 600 for training a neural network system that includes an encoder neural network, a trusted decoder neural network, and an adversary decoder neural network. In some implementations, the process 600 can be applied to train the neural network systems discussed above, e.g., systems 100 (FIG. 1) or 400 (FIG. 4). The training can be carried out by a training system having one or more computers in one or more locations.

At stage 602, the training system initializes the encoder neural network, the trusted decoder neural network, and the adversary decoder neural network. In some implementations, each of the networks is initialized randomly, i.e., the internal parameters of the neural networks are assigned random values.

At stage 604, the training system selects a batch of first training data for use in jointly training the encoder neural network and the trusted decoder neural network. The batch of first training data includes a set of training data pairs, where each training data pair includes a respective primary neural network input and a neural network input key. Some or all of the first training data pairs may have different neural network input keys.

At stage 606, the training system jointly trains the encoder neural network and the trusted decoder neural network on training data pairs from the batch of first training data. The loss function used for this training can be based in part on an estimated reconstruction of the primary neural network input generated by the adversary decoder neural network. However, during this stage of the process 600, the parameters of the adversary decoder neural network are not adjusted while training the encoder and trusted decoder neural networks. Rather, the training system alternates between training (i) the encoder and trusted decoder neural networks and (ii) the adversary decoder neural network, adversarially. Further detail on training the encoder and trusted decoder neural networks is discussed with respect to FIG. 7.

After the training system has consumed all the training data pairs in the selected batch of first training data, the system shifts from joint training the encoder neural network and the trusted decoder neural network to instead training the adversary decoder neural network. At stage 608, the training system selects a batch of second training data for use in training the adversary decoder neural network. The batch of second training data also can have different components than the training data pairs that were selected at stage 604. In some implementations, each training sample in the batch of second training data includes a respective primary neural network input and an encoded representation of the primary neural network input that was generated by the encoder neural network in accordance with current values of the parameters of the encoder neural network, i.e., after the encoder neural network's training at stage 606.

At stage 610, the adversary decoder neural network is trained on the batch of second training data. During this stage, the values of parameters of the encoder neural network and the trusted neural network are held constant. Further detail on training the adversary decoder neural network is discussed with respect to FIG. 8.

Thus, training proceeds in alternating phases between (i) training the encoder and trusted decoder neural networks and (ii) training the adversary decoder neural network. During each phase, the networks learn to better perform against the current capabilities of their adversary. For example, in a first phase of a training cycle, the encoder and trusted decoder neural networks are trained to encrypt and reconstruct neural network inputs that protect the secrecy of the input against the randomly initialized adversary decoder neural network. In the second phase of the cycle, the adversary decoder neural network is trained to reconstruct neural network inputs encoded by the encoder neural network to the extent it has been trained through the first cycle. In a first phase of the next training cycle, the encoder and trusted decoder neural networks are further trained to encrypt and reconstruct neural network inputs that protect the secrecy of the input against the adversary decoder neural network to the extent it has been trained through the current cycle. Training can proceed in an alternating fashion until an end-of-training condition occurs.

At stage 612, after all or some of the cycles, the training system determines whether to perform another training cycle. In some implementations, the training system continues to perform additional cycles until an end-of-training condition is detected. An end-of-training condition can be, for example, performance of a pre-specified number of training cycles, consumption of all available training data, achievement of a performance objective, or a combination of two or more of these. The performance objective can relate to the reconstruction error in reconstructing a neural network input by the trusted decoder neural network, the adversary decoder neural network, or both. If, at stage 612, the training system determines to continue training, the process 600 returns to stage 604. If the training system detects an occurrence of an end-of-training condition, the training can be deemed complete and is terminated (stage 614).

Figure 7:
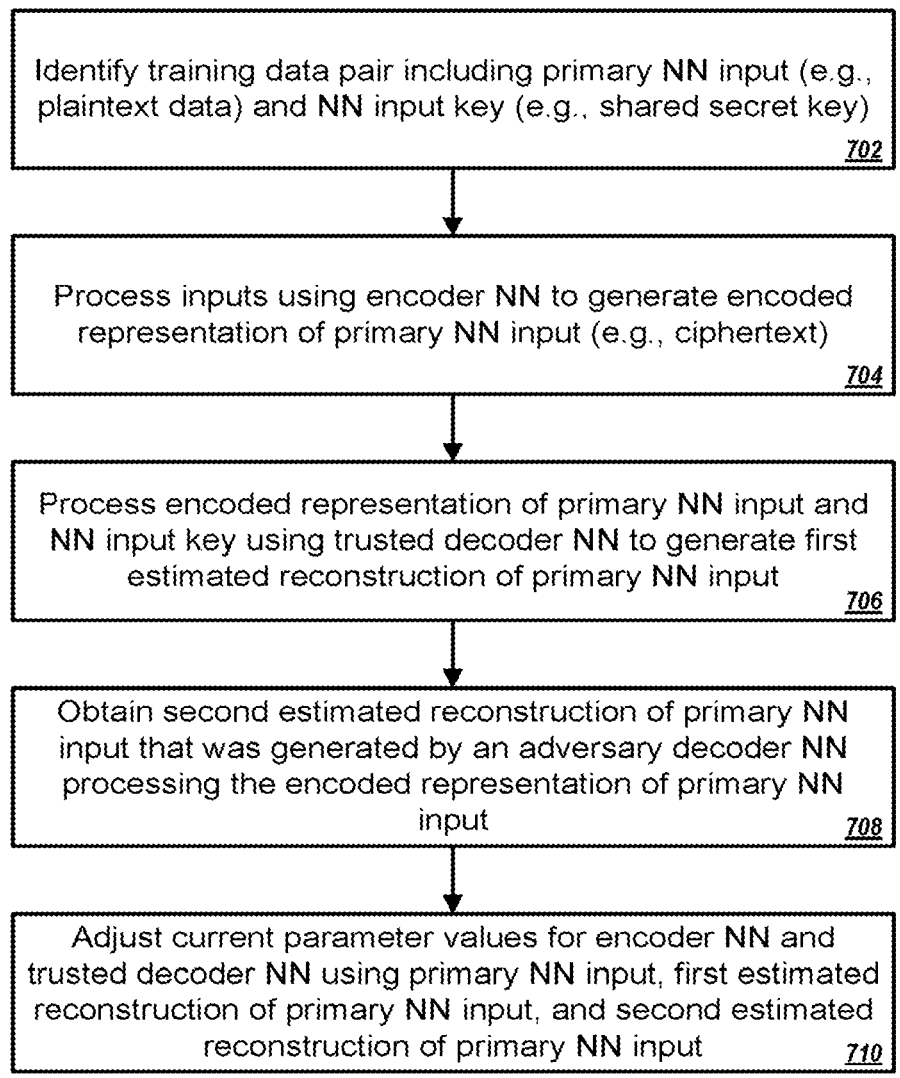
FIG. 7 is a flowchart of an example process for jointly training an encoder neural network and a trusted decoder neural network.

FIG. 7 is a flowchart of an example process 700 for jointly training an encoder neural network and a trusted decoder neural network. The training can be carried out by a training system having one or more computers in one or more locations. The flowchart shows training operations for a single training data pair from a batch of training data for a given training cycle, but in practice, the process 700 can be repeated for each training data pair in the batch.

At stage 702, the training system selects a training data pair from a current batch of training data. The training data pair includes a primary neural network input and a neural network input key. For example, the neural network input key may be a shared secret key for symmetric transformation systems or a public key for asymmetric transformation systems that use a public key for forward transformations (e.g., encoding or encryption) and a private key for reverse transformations (e.g., decoding or decryption).

At stage 704, the training system provides the primary neural network input and the neural network input key to the encoder neural network. The encoder neural network processes the pair of inputs according to current values of the parameters of the encoder neural network and generates an encoded representation of the primary neural network input.

At stage 706, the training system then provides the encoded representation of the primary neural network input and a neural network input key to the trusted decoder neural network. The trusted decoder neural network processes these inputs according to current values of the parameters of the trusted decoder neural network to generate a first estimated reconstruction of the primary neural network input. The neural network input keys provided to the encoder neural network and the trusted decoder neural network may be the same or different from each other. For example, in a symmetric transformation system, the neural network input keys may be the same. In an asymmetric transformation system, the neural network input keys may be related but different from each other (e.g., complementary keys in a public-private key pair).

At stage 708, the training system provides the encoded representation of the primary neural network input to the adversary decoder neural network. The adversary decoder neural network processes the encoded representation of the primary neural network input to generate a second estimated reconstruction of the primary neural network input. In some implementations, the adversary decoder neural network generates the second estimated reconstruction based only on the encoded representation of the primary neural network input, i.e., with a neural network input key. In other implementations, such as for asymmetric transformation systems, the training system may provide a public neural network input key (e.g., the same key that was applied to generate the encoded representation of the primary neural network input) to the adversary decoder neural network to process along with the encoded representation of the primary neural network input in generating the second estimated reconstruction of the primary neural network input.

At stage 710, the training system then adjusts the current values of the encoder neural network and the trusted decoder neural network using the primary neural network input, the first estimated reconstruction of the first neural network, and the second estimated reconstruction of the primary neural network input. In some implementations, the training system uses machine-learning techniques such as stochastic gradient descent with backpropagation to adjust values of the parameters of the encoder and trusted decoder neural networks. For example, the training system can backpropagate gradients to optimize a loss function by adjusting current values of the parameters of the neural networks. In some implementations, the loss function can be formulated so as to minimize the reconstruction error for the trusted decoder neural network, i.e., to minimize the error between the primary neural network input and the first estimated reconstruction of the primary neural network input as generated by the trusted decoder neural network. However, so that the encoder and trusted decoder neural networks are also trained to protect the secrecy of information against the adversary decoder neural network, the loss function can be further formulated so as to maximize the reconstruction error for the adversary decoder neural network, i.e., maximize the error between the primary neural network input and the second estimated reconstruction of the primary neural network input as generated by the adversary decoder neural network.

In other implementations, the loss function may not attempt to maximize the adversary neural network's reconstruction error, but rather may be formulated to minimize the mutual information between the second estimated reconstruction of the primary neural network input and the primary neural network input. In the case of symmetric encoding-decoding systems, such approach can equate to making the adversary neural network's indistinguishable from a random guess.

Figure 8:
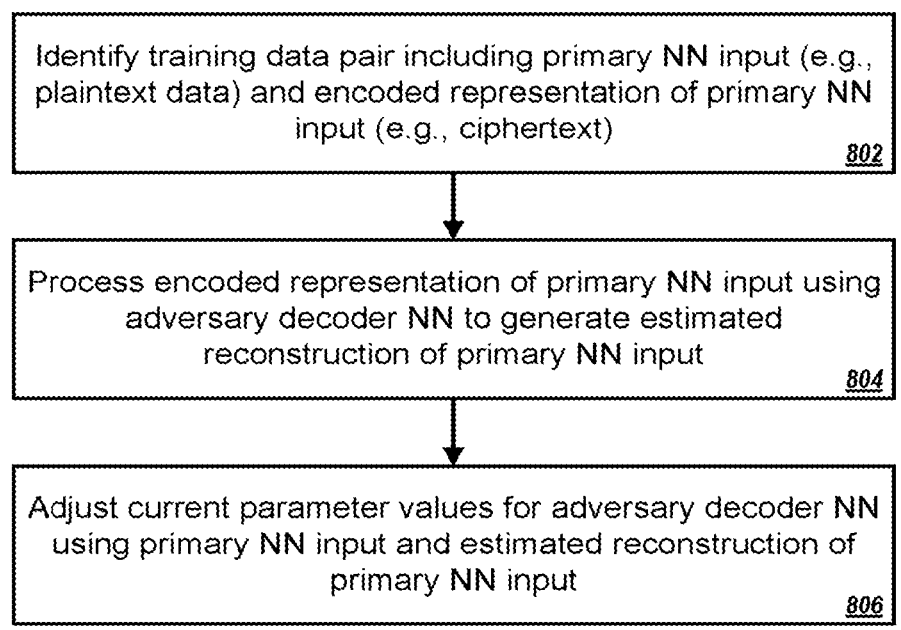
FIG. 8 is a flowchart of an example process for training an adversary decoder neural network.

FIG. 8 is a flowchart of an example process 800 for training an adversary decoder neural network. The training can be carried out by a training system having one or more computers in one or more locations. The flowchart shows training operations for a single training data pair for a given training cycle, but in practice, the process 800 can be repeated for each training data pair in a training cycle.

At stage 802, the training system obtains a training data pair. The training data pair can include a primary neural network input and an encoded representation of the primary neural network input. In some implementations, the primary neural network input is selected from a batch of pre-generated training data. The encoded representation of the primary neural network input is then generated by processing the primary neural network input and a neural network input key with an encoder neural network according to current values of the parameters of the encoder neural network from a most recent training cycle. The neural network input key may be selected from a batch of neural network input keys, and different neural network input keys may be processed to generate the encoded representation of the primary neural network input for different training data pairs.

At stage 804, the adversary decoder neural network processes the encoded representation of the primary neural network input and, optionally, the neural network input key, to generate an estimated reconstruction of the primary neural network input. If the adversary decoder neural network is an adversary to a symmetric transformation system in which the neural network input key is not public, the adversary decoder neural network may process the encoded representation of the primary neural network input without the neural network input key to generate the estimated reconstruction. If the adversary decoder neural network is an adversary to an asymmetric transformation system in which the neural network input key is public, the adversary decoder neural network may process the encoded representation of the primary neural network input along with the neural network input key to generate the estimated reconstruction.

At stage 806, the training system adjusts the values of the parameters of the adversary decoder neural network using the primary neural network input and the estimated reconstruction of the primary neural network input. In some implementations, the training system uses machine-learning techniques such as stochastic gradient descent with backpropagation to adjust values of the parameters of the adversary decoder neural network. For example, the training system can backpropagate gradients to optimize a loss function that minimizes an error between the primary neural network input and the estimated reconstruction of the primary neural network input.

In some implementations, the neural network systems described herein may be extended so that they are configured not just to protect the confidentiality of a neural network input from the adversary decoder neural network, but also are configured to protect only a particular portion (e.g., a sensitive portion) of the neural network input from the adversary decoder neural network. For example, the primary neural network input may consist of tuples of four values, <A, B, C, D>. The system can be configured to output two predictions of D, given the first three values as inputs: a "true" prediction of D that represents the most accurate possible estimate of D given <A, B, C>, and a "privacy-preserving" estimate of D, which will be referred to as D-public and which represents the best possible estimate of D that does not reveal any information about the value of C. The system organization can be similar to FIG. 1, with the encoder neural network and the trusted decoder neural network sharing a neural network key input, but here the encoder neural network receives and processes <A, B, C> to generate D-public in addition to a ciphertext. Both the trusted decoder neural network and the adversary decoder neural network have access to the encoder neural network's outputs. The trusted decoder neural network uses the encoder's outputs to generate an improved estimate of D, while the adversary decoder neural network attempts to recover C from the encoder's outputs. The system is trained and configured so that the encoder neural network can generate D-public as an approximation of D without revealing C, and so that the trusted decoder neural network can process D-public along with the ciphertext and the neural network input key to obtain an even better approximation of D (an estimated reconstruction of D). Such techniques may be useful, for example, to prevent systems from taking into account sensitive user attributes where there is a correlation between a sensitive user attribute and a non-sensitive user attribute. For instance, the tuple <A, B, C, D>, C may represent a user's age, and D may represent a user's interest. Although D does not directly reveal the user's age, some correlation may exist between age and interest. The neural network system may process <A, B, C> with the encoder neural network to estimate the user's interest D without revealing information about C.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., a GPU (graphics processing unit), an FPGA (field programmable gate array) or an ASIC (application specific integrated circuit), or multiple ones of these or combinations of these. The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for training a neural network system on one or more computers, comprising:
obtaining a plurality of training data pairs for the neural network system, each training data pair comprising a respective first input and a respective second input; and
training the neural network system on the plurality of training data pairs, comprising, for each training data pair:
processing, using an encoder neural network in accordance with current values of parameters of the encoder neural network, (i) the respective first input for the training data pair and (ii) the respective second input for the training data pair to generate an encoded representation of the respective first input for the training data pair, wherein the respective second input for the training data pair represents a symmetric encryption key;
processing, using a first decoder neural network in accordance with current values of parameters of the first decoder neural network, (i) the encoded representation of the respective first input for the training data pair and (ii) the respective second input for the training data pair to generate a first estimated reconstruction of the respective first input for the training data pair;
obtaining a second estimated reconstruction of the respective first input for the training data pair, the second estimated reconstruction generated by a second decoder neural network in accordance with current parameters of the second decoder neural network, by processing the encoded representation of the respective first input for the training data pair without processing the respective second input for the training data pair; and
adjusting the current parameters of the encoder neural network and the current parameters of the first decoder neural network based on the respective first input, the first estimated reconstruction of the respective first input, and the second estimated reconstruction of the respective first input.

2. The computer-implemented method of claim 1, wherein the encoder neural network comprises one or more fully-connected layers followed by one or more convolutional layers.

3. The computer-implemented method of claim 1, wherein the first decoder neural network comprises one or more fully-connected layers followed by one or more convolutional layers.

4. The computer-implemented method of claim 1, comprising adjusting the current parameters of the encoder neural network and the current parameters of the first decoder neural network based on at least one of (i) differences between respective first inputs from the training data pairs and estimated reconstructions of the respective first inputs generated by the first decoder neural network or (ii) differences between respective first inputs from the training data pairs and estimated reconstructions of the respective first inputs generated by the second decoder neural network.

5. The computer-implemented method of claim 1, comprising adjusting the current parameters of the encoder neural network and the current parameters of the first decoder neural network using stochastic gradient descent.

6. The computer-implemented method of claim 1, wherein training the neural network system comprises, for each training data pair, adjusting the current parameters of the encoder neural network and the current parameters of the first decoder neural network without adjusting the current parameters of the second decoder neural network.

7. The computer-implemented method of claim 1, further comprising:
obtaining a plurality of second training data pairs, each second training data pair comprising a respective third input and an encoded representation of the respective third input, wherein the encoded representation of the respective third input is generated using the encoder neural network in accordance with current parameters of the encoder neural network;
training the second decoder neural network on the plurality of second training data pairs, comprising, for each second training data pair:
processing, using the second decoder neural network in accordance with current values of the second decoder neural network, the respective encoded representation of the respective third input for the second training data pair to generate an estimated reconstruction of the respective third input for the second training data pair; and
adjusting the current parameters of the second decoder neural network based on a difference between the respective third input and the estimated reconstruction of the respective third input without adjusting the current parameters of the encoder neural network and without adjusting the current parameters of the first decoder neural network.

8. The computer-implemented method of claim 7, wherein:
for each of the second training data pairs, the encoded representation of the respective third input for the second training data pair is generated by processing with the encoder neural network (i) the respective third input and (ii) a respective fifth input corresponding to the second training data pair that is distinct from the respective third input;
training the second decoder neural network on the plurality of second training data pairs comprises, for each second training data pair, processing with the second decoder neural network, (i) the respective encoded representation of the respective third input for the second training data pair and (ii) a respective sixth input corresponding to the second training data pair; and
for each of the second training data pairs, (i) the respective fifth input is derived from the respective sixth input, (ii) the respective sixth input is derived from the respective fifth input, or (iii) the respective fifth input and the respective sixth input are both derived using a common procedure so as to be complementary to each other.

9. The computer-implemented method of claim 8, wherein, for each of the second training data pairs:
the respective fifth input corresponding to the second training data pair represents a private key of a public-private key pair; and
the respective sixth input corresponding to the second training data pair represents a public key of the public-private key pair.

10. The computer-implemented method of claim 7, comprising generating the encoded representations of the respective third inputs for the plurality of second training data pairs using the encoder neural network in accordance with current values of the encoder neural network following training of the encoder neural network with the plurality of training data pairs.

11. The computer-implemented method of claim 1, wherein the respective first input for a first training data pair among the plurality of training data pairs represents at least one of a text sequence or one or more numbers.

12. The computer-implemented method of claim 1, comprising repeatedly training, in alternation with each other, (i) the neural network system, including the encoder neural network and the first decoder neural network, and (ii) the second decoder neural network.

13. A system comprising:
   one or more processors; and
   one or more computer-readable media having instructions stored thereon that, when executed by the one or more processors, cause performance of operations comprising:
      obtaining a plurality of training data pairs for the neural network system, each training data pair comprising a respective first input and a respective second input; and
      training the neural network system on the plurality of training data pairs, comprising, for each training data pair:
         processing, using an encoder neural network in accordance with current values of parameters of the encoder neural network, (i) the respective first input for the training data pair and (ii) the respective second input for the training data pair to generate an encoded representation of the respective first input for the training data pair, wherein the respective second input for the training data pair represents a symmetric encryption key;
         processing, using a first decoder neural network in accordance with current values of parameters of the first decoder neural network, (i) the encoded representation of the respective first input for the training data pair and (ii) the respective second input for the training data pair to generate a first estimated reconstruction of the respective first input for the training data pair;
         obtaining a second estimated reconstruction of the respective first input for the training data pair, the second estimated reconstruction generated by a second decoder neural network in accordance with current parameters of the second decoder neural network, by processing the encoded representation of the respective first input for the training data pair without processing the respective second input for the training data pair; and
         adjusting the current parameters of the encoder neural network and the current parameters of the first decoder neural network based on the respective first input, the first estimated reconstruction of the respective first input, and the second estimated reconstruction of the respective first input.

14. The system of claim 13, wherein training the neural network system comprises, for each training data pair, generating, by the first decoder neural network in accordance with the current parameters of the first decoder neural network, the first estimated reconstruction of the respective first input for the training data pair by processing (i) the encoded representation of the respective first input for the training data pair and (ii) the respective second input for the training data pair.

15. One or more non-transitory computer-readable media having instructions stored thereon that, when executed by one or more processors, cause performance of operations comprising:
   obtaining a plurality of training data pairs for the neural network system, each training data pair comprising a respective first input and a respective second input; and
   training the neural network system on the plurality of training data pairs, comprising, for each training data pair:
      processing, using an encoder neural network in accordance with current values of parameters of the encoder neural network, (i) the respective first input for the training data pair and (ii) the respective second input for the training data pair to generate an encoded representation of the respective first input for the training data pair, wherein the respective second input for the training data pair represents a symmetric encryption key;
      processing, using a first decoder neural network in accordance with current values of parameters of the first decoder neural network, (i) the encoded representation of the respective first input for the training data pair and (ii) the respective second input for the training data pair to generate a first estimated reconstruction of the respective first input for the training data pair;
      obtaining a second estimated reconstruction of the respective first input for the training data pair, the second estimated reconstruction generated by a second decoder neural network in accordance with current parameters of the second decoder neural network, by processing the encoded representation of the respective first input for the training data pair without processing the respective second input for the training data pair; and
      adjusting the current parameters of the encoder neural network and the current parameters of the first decoder neural network based on the respective first input, the first estimated reconstruction of the respective first input, and the second estimated reconstruction of the respective first input.

* * * * *